United States Patent [19]

Momiyama et al.

[11] 4,381,145
[45] Apr. 26, 1983

[54] SINGLE LENS REFLEX CAMERA

[75] Inventors: Kikuo Momiyama, Yokohama; Kenichi Kumazawa, Machida, both of Japan

[73] Assignee: Canon Kabushiki Kaisha, Tokyo, Japan

[21] Appl. No.: 311,345

[22] Filed: Oct. 14, 1981

Related U.S. Application Data

[63] Continuation of Ser. No. 97,833, Nov. 26, 1979, Pat. No. 4,295,723.

[30] Foreign Application Priority Data

Nov. 24, 1978 [JP] Japan .................................. 53-145114

[51] Int. Cl.³ ........................ G03B 17/20; G03B 19/12
[52] U.S. Cl. .................................................. 354/155
[58] Field of Search ................ 354/54, 155, 224, 225, 354/289, 219

[56] References Cited

U.S. PATENT DOCUMENTS

| | | | |
|---|---|---|---|
| 3,800,655 | 4/1974 | Uchida | 354/225 |
| 3,911,457 | 10/1975 | Okuno | 354/54 X |
| 3,962,710 | 6/1976 | Okuno et al. | 354/225 |
| 4,053,912 | 10/1977 | Okuno et al. | 354/155 X |
| 4,118,723 | 10/1978 | Yamazaki et al. | 354/155 |
| 4,131,355 | 12/1978 | Kimura et al. | 354/155 |

Primary Examiner—John Gonzales
Attorney, Agent, or Firm—Toren, McGeady & Stanger

[57] ABSTRACT

In the single lens reflex camera disclosed, an elongated entrance window extending across a plane through the roof ridge of a roof pentaprism, and a smaller entrance window more remote from the plane, form a pair of windows, one of which produces light emerging from data on the camera lens barrel, and the other from data at another camera location. A mirror turns light from one of the data transverse to the plane before it is introduced through one of the windows while light from the other of the data is introduced into the other window. The prism directs the lights to the lower portion of an ocular. In a preferred embodiment, the data turned by the mirror is from the lens barrel.

1 Claim, 10 Drawing Figures

SINGLE LENS REFLEX CAMERA

This is a continuation of application, Ser. No. 097,833 filed Nov. 26, 1979, now U.S. Pat. No. 4,295,723.

BACKGROUND OF THE INVENTION

1. Field of the Invention

The present invention relates to a finder for a single lens reflex camera, which finder can simultaneously and adjacently indicate photographing informations provided at different positions of a camera, such as informations of diaphragm scale etc. marked on the outer circumference of a lens barrel together with the photographing field of view below the photographing field of view within the finder view field and informations of shutter times etc. marked around a penta roof-prism.

2. Description of the Prior Art

As a finder for a single lens reflex camera which can indicate two or more kinds of photography informations, such as information of a diaphragm scale marked on the outer circumference of a lens barrel and information of shutter times, a finder is known in which the diaphragm scale, for example, is indicated below the photographing view field while the shutter time is indicated on the side of the view field. However, this conventionally known finder has a disadvantage such that it is difficult to observe the informations simultaneously, because they are indicated at different positions in the finder view field. Meanwhile, other conventionally known informations indicating means have disadvantages such that the amplitude of indicated informations is not large enough, that the structure is complicated, or that it is necessary to change the shape of the penta prism increase the size thereof. Further, the conventionally known information indicating means are confronted with by the following disadvantage in cases where the image of lens barrel information is to be indicated together with other photographing information images adjacently in the lower portion of the photographing view field, particularly when the photographing information image is a long one, such as when the information is concerned with a shutter time scale or a meter pointer. Thus, as the lens barrel information is positioned on the optical axis of an objective lens which constitute the center of a finder optical system, this lens barrel information is necessarily indicated at the center of the lower portion of the photographing view field when an ordinary indicating optical system for the barrel information is used. Therefore, the long information image is indicated outside the central portion, and thus is very difficult to observe.

SUMMARY OF THE INVENTION

Therefore, one of the objects of the present invention is to provide a finder of small size for a single lens reflex camera, which finder can simultaneously indicate two informations, such as diaphragm scale informations indicated on the outer circumference of a lens barrel and other informations provided on different positions, adjacently below the photographing view field within a finder view field.

DETAILED DESCRIPTION OF THE INVENTION

Description of Preferred Embodiments

The present invention will be better understood from the following description of preferred embodiments.

Figure 1:
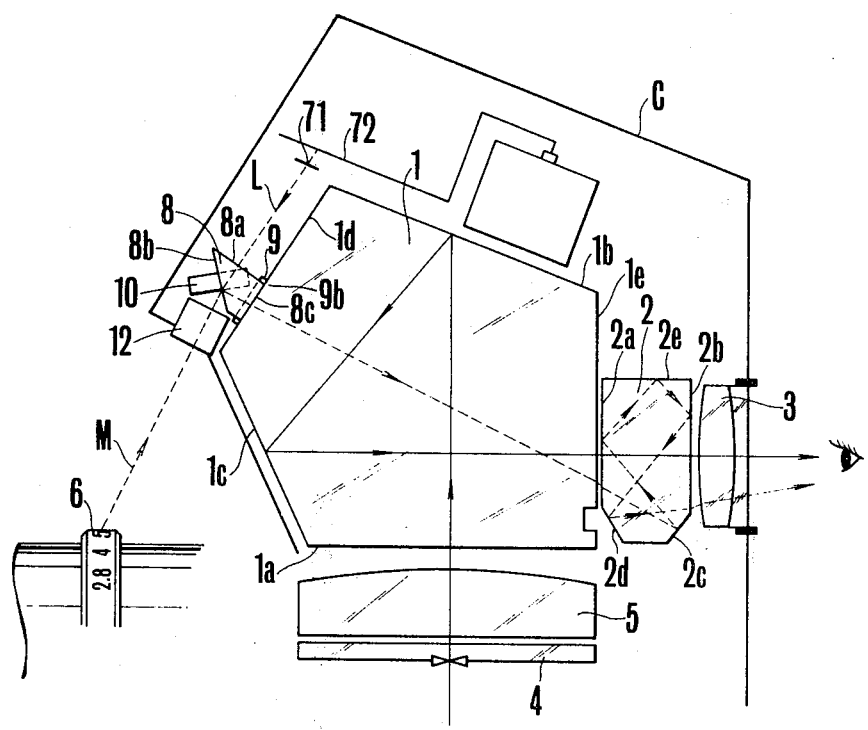
FIGS. 1 and 2 show the optical arrangement of a first embodiment, a finder for a single lens reflex camera according to the present invention.
Figure 2:
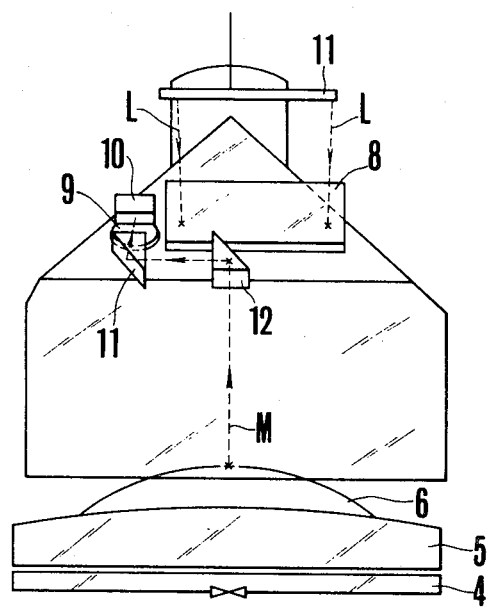

In FIGS. 1 and 2 showing a first embodiment of the present invention. C represents a camera casing and 1 is a penta roof prism and a light beam from the image of an object formed on a focusing glass 4 passes through a condenser lens 5, enters the prism 1 from the bottom incident surface 1a, reflected on the front reflecting surface 1c emitted from a rear exit surface 1e, passes through a sub-prism 2 and is directed to an ocular 3. The sub-prism 2 has a planar incidence surface 2a and a planar exit surface 2b parallel to each other, reflecting surfaces 2d and 2c in the lower portion of those parallel surfaces and a reflecting surface 2e in the upper portion of the same.

These reflecting surfaces 2d, 2c and 2e have each a reflecting film, such as of aluminum deposited thereon. 8 is a triangle prism having transmitting surfaces 8a and 8c and a reflecting surface 8b, and with the transmitting surface 8c being connected near the central portion of the front side upwardly inclined surface 1d of the penta roof prism, namely connected over the strip zone traversing the optical axis of the object lens. Therefore, this strip zone constitutes an incidence window.

The transmitting surface 8c may be arranged so as to oppose to the front upwardly inclined surface 1d with a small space therebetween, but it is more convinient to connect the surface 8c to the surface 1d because the two prisms can be easily handled as a single body and other advantages can be obtained. 71 and 72 are means for indicating informations of photographing conditions, such as shutter times and warning of a proper or improper adjustment of exposure. For example, a small meter, a luminant diode for signal indication and the like may be used as the indicating means. These information indicators are usually of relatively elongated shape as shown in FIGS. 1 and 2 in which 71 represents the shutter time scale and 72 is a meter pointer. The indication information light L emitting from the information indicating means 71 and 72 passes through the transmitting surface 8a of the triangle prism 8, reflected on the reflecting surface 8b and is directed below the rear exit surface 1e of the penta roof prism 1 from the transmitting surface 8c connected to the front inclined surface 1d of the penta roof prism 1. Then after emittance from the rear exit surface 1e of the prism 1, the light enters the sub-prism 2 from its transmitting surface 2a, reflected successively by each of surfaces 2c, 2a, 2e, 2b and 2d, and emitted from the transmitting surface 2b toward the ocular 3. 9 is a concave lens with its second surface 9b connected to the side of the front inclined surface 1d of the penta roof prism. This concave lens 9 and the triangle prism 8 are arranged in the plane including the edge line separating the roof surfaces of the penta roof prism and the optical axis of the objective lens, namely arranged in a line vertical to the plane of FIG. 1.

Figure 3:
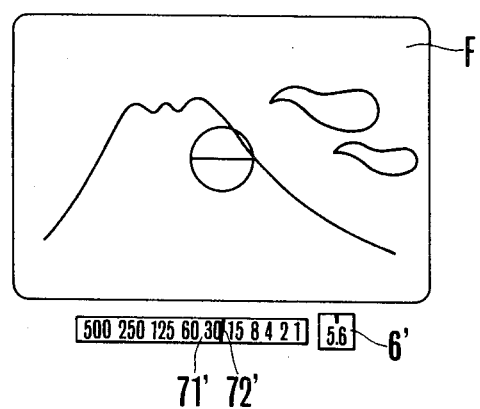
FIG. 3 shows the view field of the finder shown in FIG. 1.
Figure 10:
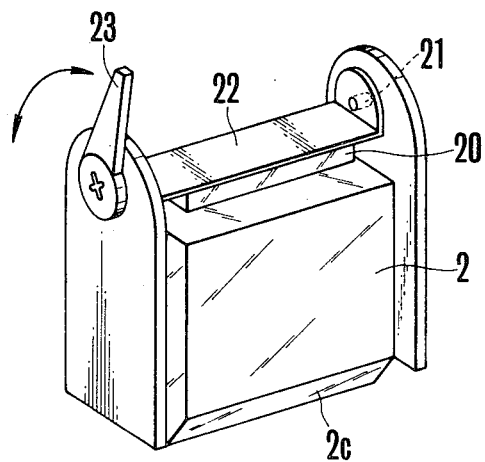

The second surface 9b may be arranged opposing to the front inclined surface 1d with a small space therebetween, but it is more advantageous to connect these surfaces because the concave lens 9 and the penta roof prism 1 can be easily handled as one body. 10, 11 and 12 respectively represent a reflecting member. In the embodiment shown in FIGS. 1 and 2, 10 is a planar mirror, 11 and 12 are a triangle prism mirror. 6 represents informations indicated on the outer circumference of the lens barrel, such as a diaphragm scale marked around a diaphragm scale ring as illustrated in FIGS. 1 and 2. The indication information light M from the diaphragm scale 6 is reflected sidewise by the prism mirror 12 positioned near the center of the front inclined surface 1d of the penta proof prism, there is reflected upward by the prism mirror 11 and is further reflected by the planar mirror 10 to be directed to the concave lens 9, by which the light is refracted and directed below the rear exit surface 1e of the prism 1 from the surface 9b connected to the front inclined surface 1d almost at the same angle as the other indication information light L. After the emittance from the rear exit surface 1e of the prism 1, the light M is directed to the ocular 3 along the same course as the other indication information light L. Then as shown in FIG. 3, the information 6 is indicated as an indicated informations 6', and the informations 71 and 72 are indicated as indicated informations 71' and 72' all together adjacently at predetermined positions below the photographing view field F of the finder.

According to the above embodiment, the reflection by the surfaces 2a and 2b in the sub-prism 2 is a total reflection. The planar mirror 10, the prism mirrors 11 and 12, all being the reflecting member, may be substituted by a prism mirror and a planar mirror respectively.

The above embodiment has advantages that the diaphragm scale marked around the outer circumference of the lens barrel and the shutter scale and the meter pointer located on the upper portion of the penta roof prism can be simultaneously and adjacently observed below the photographing view field of the finder, and that the amplitude of the indicated information can be made large enough because the diaphragm scale information which is of small amplitude is indicated in the marginal portion while the shutter scale information which is of large amplitude is indicated in the central portion.

Figure 4:
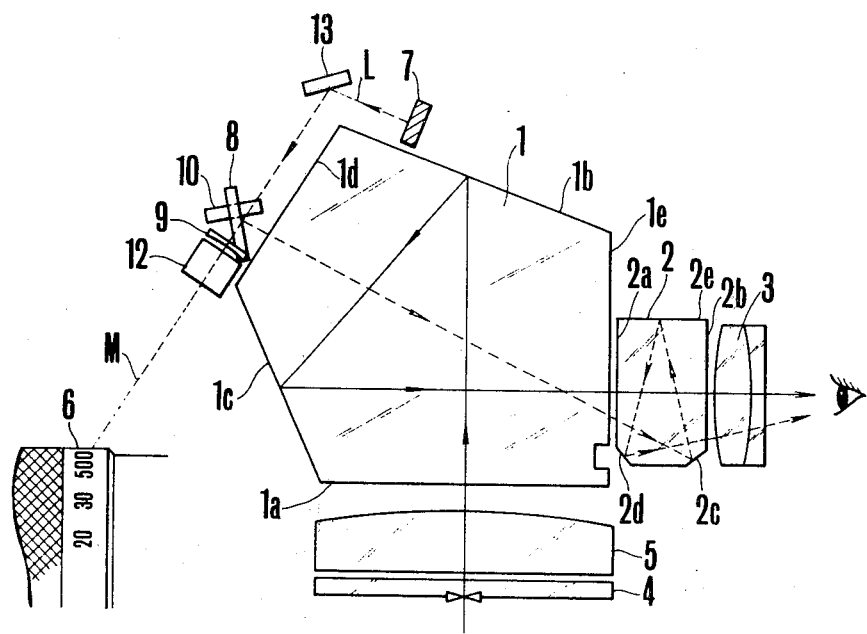
FIGS. 4 and 5 show the optical arrangement of a second embodiment according to the present invention.
Figure 5:
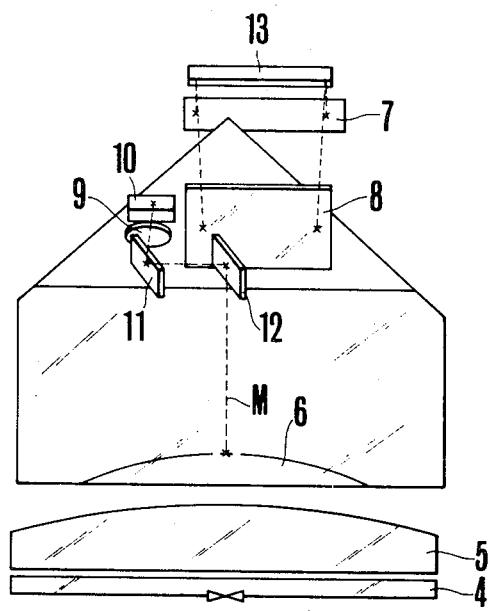
Figure 6:
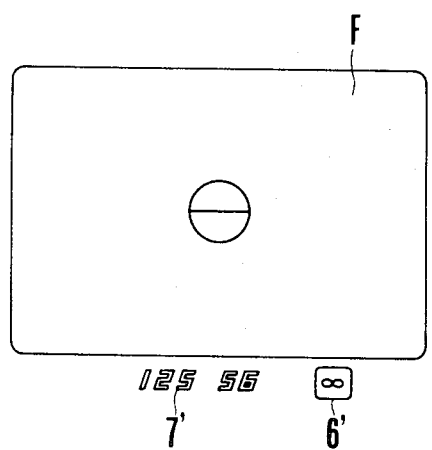
FIG. 6 shows the view field of the finder shown in FIG. 4.

FIGS. 4 and 5 show a second embodiment of the present invention, in which 1 is a penta roof prism, 2 is a sub-prism, 3 is an ocular. The arrangement of these members is almost same as in FIGS. 1 and 2. According to the second embodiment, the indication information lights L and M are reflected by the surfaces 2c, 2e and 2d in the sub-prism in such a manner that these lights are directed to the ocular. Instead of the diaphragm scale in the first embodiment, the distance scale is marked around the lens barrel in the second embodiment.

The optical path of the indication information light M for the distance scale is almost same as the embodiment shown in FIGS. 1 and 2 except that the concave lens 9 is arranged between the planar mirrors 10 and 11. Also the other information is an illuminant diode for signal indication which indicates informations of the shutter, diaphragm etc. The optical path of the indication information light L from the diode 7 is almost same as the embodiment shown in FIGS. 1 and 2, except that a planar mirror 8 is used in place of the triangle prism as the reflecting member, and the light is introduced to this reflecting member through an auxiliary mirror 13.

Figure 7:
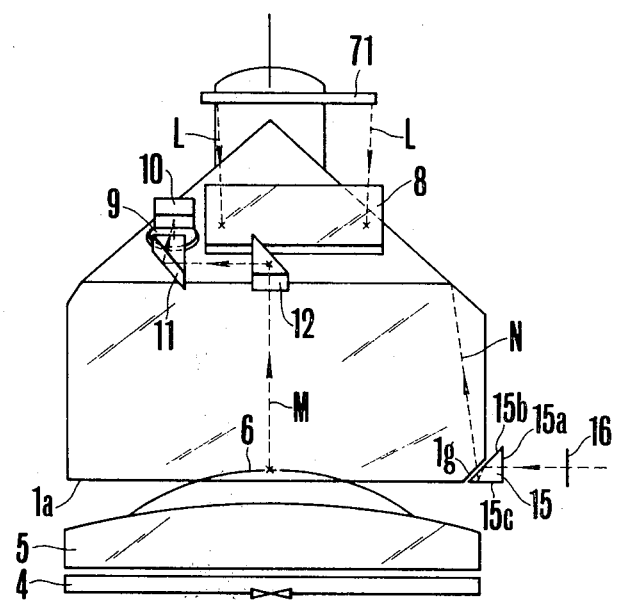
FIG. 7 shows the optical arrangement of a third embodiment according to the present invention.
Figure 8:
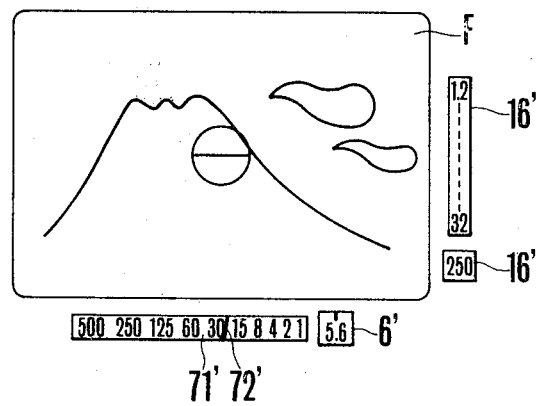
FIG. 8 shows the view field of a third embodiment of the finder according to the present invention.

FIG. 7 shows a third embodiment of the present invention, in which a third information in addition to the two informations shown in FIG. 1 and 2 is indicated on the side of the photographing view field of the finder. The optical paths of the light M for the information marked around the outer circumference of the lens barrel and the light L for the informations marked on the upper portion of the penta roof prism are almost same as in the embodiment shown in FIGS. 1 and 2.

According to the third embodiment, the penta roof prism 1 has a bottom incidence surface 1a with its side face forming slantly worked a transmitting surface 15a. 15 is a triangle prism having a transmitting surfaces 15a and 15b and a reflecting surface 15c coated with a reflecting film. The transmitting surface 15b is arranged so as to oppose to the transmitting surface 1g of the penta roof prism with a small space therebetween. 16 is means for indicating informations such as a shutter scale, a diaphragm scale and a meter pointer. The indication information light N from the information indicating means enters the prism 15 from the transmitting surface 15a of the triangle prism 15, then is emitted from the transmitting surface 15b by the total reflection on the transmitting surface 15b and reflection on the reflecting surface 15c and is directed to the transmitting surface 1g of the penta roof prism.

From the surface 1g, the light enters the prism 1 and is directed to the accurate via the same optical path as the light of the photographing view field and is indicated as an indicated information 16' on the side of the photographing view field. According to this third embodiment, it is possible to indicate many informations, and it is also possible to interchangeably indicate informations of diaphragm preference mode below the photographing view field and the informations of shutter-preference mode on the side of the view field.

Figure 9:
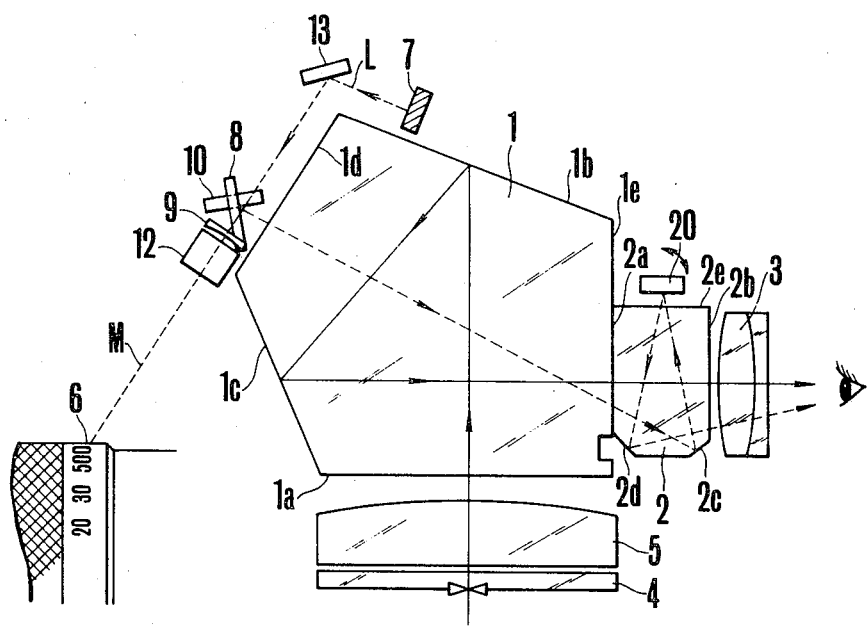
FIGS. 9 and 10 show a fourth embodiment of the finder according to the present invention.

FIGS. 9 and 10 illustrate a fourth embodiment of the present invention, which is quite similar to the embodiment shown in FIG. 4 except that the prism 2 is arranged between the exit surface and the ocular and is bounded with the exit surface 1e of the penta prism 1, and that the upper surface 2e of the prism forms a transmitting surface.

Therefore, the information light reflected on the reflecting surface 2c transmits the surface 2e and is then reflected on the mirror 20 toward the reflecting surface 2d, while the mirror 20 is supported by a mirror supporting member 22 rotatable by a rotation shaft 21. Therefore, by rotation of a lever 23 which controls the rotation of the rotation shaft 21, the light from the reflecting surface 2c is no more reflected toward the reflecting surface 2d. Therefore, it is possible to discontinue the indication by the operation of this lever in case the indication is not necessary.

The present invention having structural features as above described has advantages that the diaphragm scale marked around the outer circumference of the lens barrel and the shutter scale and the meter pointer located on the upper portion of the penta roof prism can be simultaneously and adjacently observed below the photographing view field of the finder, and that the amplitude of the indicated information can be made large enough because the diaphragm scale information which is of small amplitude is indicated in the marginal portion while the shutter scale information which is of large amplitude is indicated in the central portion, that it is also possible to indicate a third information from the bottom entrance surface of the penta roof prism because this portion is not used, that an enough optical path can be provided in the prism because the information light is turned upward and then turned downward within the prism and that the structure is relatively small and provides much freedom for the arrangement of informations, thus providing many advantages in camera design works.

What is claimed is:

1. A single lens reflex camera, comprising:
   a focusing plate;
   an objective lens for forming an image of an object on the focusing plate and on a plane at which a photosensitive surface is to be placed;
   a viewfinder system for viewing the object image formed on the focusing plate and photographic data indicated on parts of the single lens reflex camera;
   said viewfinder system including a pentagonal roof prism having a non-reflecting front surface, an eyepiece, a sub-prism having at least two reflecting surfaces, and a variable reflecting member having at least one reflecting surface;
   said sub-prism being arranged between the pentagonal roof prism and the eyepiece;
   said pentagonal roof prism being arranged so that when light from photographic data is introduced at the non-reflecting surface of the pentagonal roof prism into the inside thereof, the light is reflected by one of the reflecting surfaces of the sub-prism, projected to the exterior toward the reflecting member, reflected by the reflecting surface of the reflecting member so as to be introduced into the inside of the sub-prism, reflected by the outer reflecting surface of the sub-prism toward the eyepiece;
   said viewfinder system further including a view field frame, said light reflected by the other reflecting surface of the sub-prism being directed toward the eyepiece to indicate the photographic data around the photographic view field frame;
   the photographic data indicated around the frame being extinguishable or reproducible by varying the reflecting member.

* * * * *